United States Patent [19]

Cargnel

[11] Patent Number: 4,533,718

[45] Date of Patent: Aug. 6, 1985

[54] OIL AND HIGH TEMPERATURE RESISTANT INSULATING VARNISH MADE FROM MODIFIED METHOXY FUNCTIONAL DIPHENYL OXIDE

[75] Inventor: Louis A. Cargnel, Unity Township, Westmoreland County, Pa.

[73] Assignee: Westinghouse Electric Corp., Pittsburgh, Pa.

[21] Appl. No.: 629,391

[22] Filed: Jul. 10, 1984

[51] Int. Cl.$^3$ .............................................. C08G 77/04
[52] U.S. Cl. .................................. 528/86; 106/287.23; 106/287.34; 524/404; 524/411; 524/413; 524/493
[58] Field of Search ..................... 528/86; 106/287.23, 106/287.34; 524/493, 404

[56] References Cited

U.S. PATENT DOCUMENTS

| | | | |
|---|---|---|---|
| 3,269,973 | 8/1966 | Doedens et al. | 528/86 |
| 3,323,962 | 6/1967 | Sprengling et al. | 528/86 |
| 3,342,873 | 9/1967 | Doedens et al. | 528/86 |
| 3,405,091 | 10/1968 | Sprengling et al. | 528/86 |
| 4,154,767 | 5/1979 | Plepys et al. | 252/188.3 |
| 4,188,473 | 2/1980 | Nelson | 528/86 |

*Primary Examiner*—Lorenzo B. Hayes
*Attorney, Agent, or Firm*—D. P. Cillo

[57] ABSTRACT

A heat curable, storage stable, insulating varnish is made by heat reacting: (A) a methoxy functional diphenyl oxide resinous material, (B) a metal halide catalyst, and (C) silicon dioxide acting as a stabilizer, after which a suitable solvent can be added to provide a solids content of from about 25 wt. % to about 75 wt. %.

11 Claims, No Drawings

OIL AND HIGH TEMPERATURE RESISTANT INSULATING VARNISH MADE FROM MODIFIED METHOXY FUNCTIONAL DIPHENYL OXIDE

BACKGROUND OF THE INVENTION

Dip and bake insulation coatings for use in high performance motors and generators were taught by Sprengling et al., in U.S. Pat. No. 3,405,091. There, a mixture containing monomeric chloromethyl diphenyl oxide, unsubstituted diphenyl oxide, and from about 0.008% to 20% of catalyst selected from one of Friedel-Crafts catalysts, such as $AlCl_3$, $ZnCl_2$ or $BF_3$; silica, such as 5 micron Minusil $SiO_2$ powder; diatomaceous earth; bentonite; organic soluble metallic chelates, such as ferric acetyl acetonate; or p-toluene sulfonic acid, was heated, at from about 50° C. to 150° C., until all the chlorine reacted, followed by vacuum stripping of unreacted diphenyl oxide, to provide a soluble, fusible novolac resin product. Where $SiO_2$ powder or metallic chelates were used as catalysts, HCl could be added as an accelerator capable of adsorption on the catalyst surface, releasing iron impurities which improved overall catalytic effect.

The novolac resin of Sprengling et al. was then reacted with methoxymethyl diphenyl oxide monomer, optionally using the same amounts and kinds of previously used catalysts, only to a point where the product was still soluble in common solvents, and would still contain unreacted methoxymethyl functional groups, which upon further heating, at about 200° C. for about 4 hours, would react to form a cured thermoset insulation, with thermal breakdown times greater than 200 hours at 300° C. The use of methoxymethyl or other alkyl substituted diphenyl ethers for the chloromethyl diphenyl oxide, was taught as making it impractical to strip off free diphenyl oxide, which would contribute to weight loss during long, high temperature thermal aging, because it would evaporate at high temperatures. While this provided excellent insulation products, the formation of chloromethyl ethers in the process caused health concerns.

Plepys et al., in U.S. Pat. No. 4,154,767, and Nelson, in U.S. Pat. No. 4,188,473 taught poly(methylene diphenyl ether) laminating, molding, or film-forming materials, which could be cured or thermoset by heat, and which were produced without the use of chloromethyl diphenyl oxide. In those patents, diphenyl oxide was mixed with formaldehyde, water, methanol, and a strong acid catalyst, selected from one of sulfuric acid, phosphoric acid, p-toluene sulfonic acid, perchloric acid, diphenyl oxide sulfonic acid, or strong acid cation exchange resin, and the mixture was heated at from about 50° C. to 250° C., followed by vacuum stripping of unreacted diphenyl oxide, to provide a mixture of ortho and para methoxymethyl diphenyl oxides, para-bis(phenoxymethyl)methane, and a 40% mixture of other diphenyl oxides. This reaction product could be polymerized by further reaction, for 1 hour to 2 hours, at from about 140° C. to 165° C., with from about 0.2 wt.% to 0.3 wt.% of a Friedel-Crafts acid catalyst, particularly an alkylated diphenyl oxide disulfonic acid, to form a cured thermoset resin. These resins, however, have been found to have a relatively short shelf life, tending to form a flaky precipitate after about 3 months, which is almost impossible to redissolve. What is needed is a non-toxic, high bond strength insulation, having good room temperature storage stability.

SUMMARY OF THE INVENTION

The above problems have been solved and the above needs met by providing a resinous insulating varnish, formed by reacting, at from about 120° C. to about 175° C., an admixture of: (1) a methoxy functional diphenyl oxide resinous material, formed without using a chloromethyl diphenyl oxide starting material, with (2) from about 0.01 wt.% to about 0.2 wt.%, based on the weight of (1), of a metal halide Friedel-Crafts catalyst, preferably $FeCl_3$, where the catalyst is solubilized in a low molecular weight, low carbon chain alcohol, and with (3) from about 2 wt.% to about 10 wt.%, based on the weight of (1), of from about 0.1 micron to about 10 microns diameter, particulate silicon dioxide, acting as a stabilizer to control the reaction rate, and prevent solid precipitate upon long, room temperature storage.

Bond strengths of this reacted resinous admixture, when aged in air at 250° C. for 400 hours, are over 25 pounds, when samples are broken at 200° C. Hot oil bond strength is also excellent, providing over 20 pounds, when aged at 280° C. in oil for 500 hours and broken at 200° C. High hot oil bond strengths are very important for insulation for high performance motors utilizing oil cooling.

The silicon dioxide in this particular formulation is theorized as preventing precipitate due to complexing with the metal halide or reversible adsorption of metal halide on the silicon dioxide. In order to insure high temperature bond strengths, the methoxy functional diphenyl oxide resinous material preferably will contain a major amount of oligomer component having weight average molecular weights of over about 350, and very minor amounts of free, unsubstituted diphenyl oxide monomer.

DESCRIPTION OF THE PREFERRED EMBODIMENTS

The resinous material, which is reacted to form the insulating varnish of this invention, contains various types of methoxy functional diphenyl oxides in monomeric form and oligomeric form. This resinous material is formed without using a chloromethyl diphenyl oxide starting material, according to the teachings of Plepys et al., in U.S. Pat. No. 4,154,767, herein incorporated by reference, and will generally contain: para-methoxymethyl diphenyl oxide; ortho-methoxymethyl diphenyl oxide; ortho or para methoxymethoxymethyl diphenyl oxide; and ortho-ortho, para-para, or ortho-para-di methoxymethyl diphenyl oxide, with varying amounts of: diphenyl oxide; methyl diphenyl oxide; hydroxymethyl diphenyl oxide; tri methoxymethyl diphenyl oxide; ortho and para-bis phenoxyphenyl methane also being present.

All of these monomers can be present, and depending on the length of reaction, they may combine to form higher weight oligomers. Both of these monomers and their combination as oligomers, possibly up to 80 wt.% oligomer, are all herein defined as "methoxy functional diphenyl oxide resinous material". Preferably, the methoxy functional diphenyl oxide resinous material used in the varnish of this invention will contain only up to about 5 wt.%, i.e. below about 5 wt.%, of free diphenyl oxide monomer and will contain over about 50 wt.% oligomers having a weight average molecular weight of over about 350, to maximize high temperature properties.

The weight average molecular weight of the methoxy functional diphenyl oxide resinous material, i.e., mixture of monomers plus oligomers formed from a combination of monomers, is preferably from about 500 to about 850. Weight average molecular weight is defined as [Sum of (weight of all molecules of each size X molecular weight)]/[Total weight of all molecules]=Mω. The use of such relatively high Mω values provides improved high temperature capability for the varnish.

This methoxy functional diphenyl oxide resinous material is produced by (1) admixing: 1 mole of a diaryl compound selected from diphenyl oxide, diphenyl sulfide, their alkylated derivatives, or their mixtures; about 1 mole to 3 moles of formaldehyde; about 0.01 mole to 2 moles of water; and about 0.3 mole to 10 moles of an aliphatic monohydroxy hydrocarbon compound having from 0 to 3 ether oxygens, not more than 4 carbon atoms between ether oxygens, and at least one free hydroxyl group, such as methanol, ethanol, ethylene glycol monomethyl ether and the like, and (2) heating the admixture between about 50° C. to about 250° C. in the presence of a catalytic amount of a strong acid catalyst. The longer the heating, the more the monomers will combined to form higher molecular weight oligomers.

Useful catalysts, for this invention, used with the methoxy functional diphenyl oxide resinous material, to form polymers, include metal halide Friedel-Crafts catalysts, preferably selected from $AlCl_3$, $BF_3$, $SbCl_5$, $ZnCl_2$, $TiCl_4$ and most preferably, $FeCl_3$, and mixtures thereof. When used alone, these metal halide catalysts can cause up to 10 wt.% of high molecular weight precipitate formation in the varnish after 3 months to 4 months storage at ambient temperatures. Such precipitate can deplete desirable high molecular weight varnish components, harming high temperature varnish properties. The precipitate also causes pumping, stirring and other transport properties and may require expensive filtration. We have found that combination with $SiO_2$ prevents these problems. Preferably the metal halide catalyst is added to a low molecular weight, low carbon chain alcohol, i.e., from 1 to 6 carbon atoms, to provide a solution or a dispersion of the catalyst, which when added to the methoxy functional diphenyl oxide resinous material, prevents localization of the catalyst reaction.

The essential stabilizer for the catalyst is particulate silicon dioxide having a particle size of up to about 10 microns, preferably from about 0.1 micron to about 10 microns, and most preferably from about 2 microns to about 6 microns. Over about 10 microns particle size, not enough silicon dioxide surface area is available for interaction with the catalyst and the stabilizing effect is lost. When used alone, silicon dioxide has been thought of as a catalyst for diphenyl oxide type resins; however, when used in combination with a metal halide catalyst, the silicon dioxide surprisingly acts to hinder catalytic activity at room temperature.

In the method of this invention, methoxy functional diphenyl oxide resinous material is placed in a reaction vessel. The solubilized metal halide catalyst and silicon dioxide are then added. The admixture is then reacted for from 2 hours to 6 hours at from about 120° C. to about 175° C., to provide a stable varnish which is cooled to room temperature. It is then cut to from about 25 wt.% to about 75 wt.% solids with a suitable solvent, such as toluene, xylene and the like, and then stored until required. Upon application to a suitable copper, aluminum, iron, or other substrate, final polymerization to complete cure can be effected in from 4 hours to 18 hours at from about 220° C. to about 280° C.

The active portion of the catalyst, i.e., the metal halide component, excluding any attached water present, must be present in the range of from about 0.01 wt.% to about 0.2 wt.%, preferably from about 0.02 wt.% to about 0.1 wt.%, based on the weight of methoxy functional diphenyl oxide resinous material, in order to provide appropriate gel and cure times, and in combination with the silicon dioxide, allow good storage stability. The silicon dioxide must be present, in substantial amounts, in the range from about 2 wt.% to about 10 wt.%, preferably from about 4 wt.% to about 6 wt.%, based on the weight of methoxy functional diphenyl oxide resinous material. Over about 10 wt.% silicon dioxide, catalytic effect of the catalyst is hindered substantially. Under about 2 wt.% silicon dioxide, storage stability of the insulating varnish is reduced, and a flaky precipitate in the insulating varnish becomes probable. As is well known in the art, appropriate amounts of non-reactive fillers, coloring pigments and the like can also be included in the insulating varnish formulation.

While applicant is not to be held to any particular theory, it is though that the metal halide catalyst and silicon dioxide produce opposite effects when used together, and interact in a fashion that causes stabilization of the metal halide catalyst at room temperature, during storage of the insulating varnish, and yet allow full catalytic activity of the metal halide catalyst at varnish cure temperatures, to provide excellent cross-linking, and resulting good high temperature properties.

One or two possible interactions may occur between the catalyst and the silicon dioxide ($SiO_2$). In one possible interaction, the following mechanism may take place, using $FeCl_3$ as an example:

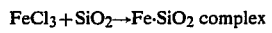

Here, the Fe-$SiO_2$ complex is still an active catalyst for high temperature polymerization, but catalytic activity is substantially lowered from the uncomplexed $FeCl_3$. In the other possible interaction, the following mechanism may take place:

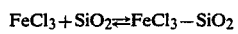

Here, there is reversible adsorption of the $FeCl_3$ on the $SiO_2$ surface and only the free dissolved $FeCl_3$ remains as an active catalyst until heat is applied. In any event, when the silicon dioxide is combined with the metal halide it does not function as a catalyst, as it might if used alone. Additionally, by using a metal halide in combination with $SiO_2$, metal is added in controlled amounts and estimation of impurity amounts which may or may not be contained in $SiO_2$ is not required.

EXAMPLE 1

A high bond strength, oil resistant insulating varnish was made. Into a reaction vessel with a magnetic stirrer the following ingredients were added:
(A) 76.5 grams of a methoxy functional diphenyl oxide resinous material, Ingredient 1, having the following approximate analysis obtained by quantitative vapor phase chromatography, where DPO=diphenyl oxide:

25 wt.% mixture of the following monomers:
diphenyl oxide*
para-methoxymethyl DPO
ortho-methoxymethyl DPO
para, para-di methoxymethyl DPO
ortho, para-di methoxymethyl DPO
ortho, ortho-di methoxymethyl DPO p2 para-methoxymethoxymethyl DPO
ortho-methoxymethoxymethyl DPO
methyl DPO
hydroxy methyl DPO
tri-methoxymethyl DPO isomers
para-bis-phenoxyphenyl methane
ortho-bis-phenoxyphenyl methane, and 75 wt.% of combinations of the above monomers, with oligomer weight average molecular weights over 396, as determind by gas phase chromatography.

(B) 3.8 grams of 5 micron particle size silicon dioxide, and (C) 0.06 gram of $FeCl_3$, added as 0.104 gram of $FeCl_3 \cdot 6H_2O$ dissolved in 13 ml. of methanol.

*total diphenyl oxide monomer in the methoxy functional diphenyl oxide resinous material was 3.3 wt.%.

The ingredients were mixed and then heated at 145° C. for 5 hours to form a thick varnish. The varnish was then cut with toluene solvent to a 49 wt.% solids solution having a viscosity of about 200 cps. at 25° C. This varnish solution was poured into aluminum sample dishes and placed in a 150° C. oven. Gel time was found to be 12 minutes at 150° C. This varnish was then poured into several small glass jars and tightly sealed, with some air space allowed. After storage at 25° C. for 12 months, no flaky precipitate would be detected. The varnish contained 4.7 wt.% of silicon dioxide based on Ingredient 1, and 0.078 wt.% of $FeCl_3$ based on Ingredient 1. The $M\omega$ of the methoxy functional diphenyl oxide resinous material (Ingredient 1) was between 650 and 725.

The methoxy functional diphenyl oxide resinous material was made by reacting 1 mole of diphenyl oxide, 1 mole of methanol, 5 moles of para formaldehyde, 1 mole of water and 0.1 mole of sulfuric acid. This provided a low methanol, high formaldehyde ratio, contributing to formation of a high percentage of oligomers. Also, the materials were reacted at 130° C. for 6 hours. Such relatively long cooking also contributed to a relatively high molecular weight product having a major amount of oligomer formation.

EXAMPLE 2

A varnish similar to that of Example 1 was made using the same type of reaction vessel into which the following ingredients were added:

(A) 153.0 grams of the methoxyfunctional diphenyl oxide resinous material, Ingredient 1 of Example 1.

(B) 7.6 grams of 5 micron particle size silicon dioxide, and (C) 0.09 grams of $FeCl_3$, added as 0.16 gram of $FeCl_3 \cdot 6H_2O$ dissolved in 20 ml of methanol.

The ingredients were mixed and then heated at 145° C. for 3.5 hours to form a thick varnish. The varnish was then cut with toluene solvent to a 60 wt.% solids solution having a viscosity of about 350 cps. at 25° C. This varnish solution was poured into aluminum sample dishes and placed in a 150° C. oven. Gel time was found to be 39 minutes at 150° C. This varnish was then poured into several small glass jars and tightly sealed, with some air space allowed. After storage at 25° C. for 12 months, no flaky precpitate would be detected. The varnish contained 4.7 wt.% of silicon dioxide based on Ingredient 1, and 0.058 wt.% of $FeCl_3$ based on Ingredient 1.

EXAMPLE 3

A varnish similar to that of Example 1 was made using the same type of reaction vessel into which the following ingredients were added:

(A) 306.0 grams of the methoxyfunctional diphenyl oxide resinous material, Ingredient 1 of Example 1.

(B) 15.2 grams of 5 micron particle size silicon dioxide, and (C) 0.29 gram of $FeCl_3$, added as 0.482 gram of $FeCl_3 \cdot 6H_2O$ dissolved in 60 ml of methanol.

The ingredients were mixed and then heated at 145° C. for 2.5 hours to form a thick varnish. The varnish was then cut with toluene solvent to a 50 wt.% solids solution having a viscosity of about 200 cps. at 25° C. This varnish solution was poured into aluminum sample dishes and placed in a 150° C. oven. Gel time was found to be 9.5 minutes at 150° C. This varnish was then poured into several small glass jars and tightly sealed, with some air space allowed. After storage at 25° C. over 8 months, no flaky precipitate would be detected. The varnish contained 4.7 wt.% of silicon dioxide based on Ingredient 1, and 0.094 wt.% of $FeCl_3$ based on Ingredient 1.

COMPARATIVE EXAMPLE 1

A varnish similar to that of Example 1 was made using the same type of reaction vessel into which the following ingredients were added:

(A) 76.5 grams of the methoxyfunctional diphenyl oxide resinous material, Ingredient 1 of Example 1 and (B) 0.05 grams of $FeCl_3$, added as 0.08 grams of $FeCl_3 \cdot 6H_2O$ dissolved in 10 ml of methanol.

Here, no silicon dioxide was used in the formulation. The ingredients were mixed and then heated to 145° C. for 3 hours to form a thick varnish. The varnish was then cut with toluene solvent to a 60 wt.% solids solution having a viscosity of bout 350 cps. at 25° C. This varnish solution was poured into aluminum sample dishes and placed in a 150° C. oven. Gel time was found to be 12.4 minutes at 150° C. This varnish was then poured into several small glass jars and tightly sealed, with some air space allowed. After storage at 25° C. over 3 months, a flaky precipitate was visible in the jars. This precipitate constituted about 5 wt.% of the varnish after 4 months. The varnish contained 0 wt.% of silicon dioxide based on Ingredient 1, and 0.065 wt.% of $FeCl_3$ based on Ingredient 1.

COMPARATIVE EXAMPLE 2

A varnish was made using a reaction vessel with a stirrer, similar to that used in Example 1, into which the following ingredients were added:

(A) 76.5 grams of a methoxyfunctional diphenyl oxide containing 0.08% hydrolyzable chlorine and 14.36% of —$OCH_3$, having the following approximate analysis obtained by quantitative vapor phase chromatography, where DPO=diphenyl oxide:

13.2 wt.% diphenyl oxide
46.0 wt.% para-methoxymethyl DPO monomer 9.6 wt.% ortho-methoxymethyl DPO monomer 9.7 wt.% ortho, para-di methoxymethyl DPO monomer 14.7 wt.% para, para-di methoxymethyl DPO monomer 4.3 wt.% unknown.

(B) 1.25 grams of chloromethyl diphenyl ether, containing 16% hydrolyzable chlorine, and (C) 3.8 grams of 5 micron particle size silicon dioxide acting as a catalyst.

The ingredients were mixed and then heated at 145° C. for 5 hours to form a thick varnish. The varnish was then cut with toluene solvent to a 50 wt.% solids solution having a viscosity of about 200 cps. at 25° C. This varnish solution was poured into aluminum sample dishes and placed in a 150° C. oven. Gel time was found to be 15 minutes at 150° C. This varnish was then poured into several small glass jars and tightly sealed, with some air space allowed. After storage at 25° C. for 12 months, no flaky precipitate could be detected. The varnish contained 4.7 wt.% of silicon dioxide based on Ingredient 1. This formulation did not provide the outstanding cross-linking, in part due to the large amount of diphenyl oxide monomer present in the starting material and use of silicon dioxide solely as catalyst. This lack of cross-linking is evident in the results of the following Table 1.

Bond strength tests were then run on the varnishes of Example 1 and Comparative Example 2, after aging in air at 250° C. and in oil at 280° C. Here a helical coil ¼" I.D. and 4" long, made from a double build of coated polyimide insulated #18 copper wire were tested. The varnish build was 3 mils total (0.003 inch) after 2 dips. Final cure of the insulating varnish was 16 hours at 230° C. The coils were aged in air at 250° C. and broken at 200° C. (ASTM NOS. D-3145 & D-2519) and aged in oil at 280° C. and broken at 200° C. with a dwell in both cases before brake of 5 minutes at temperature. The results are shown below in Table 1:

TABLE 1

| Sample | Aged in Air at 250° C. Broken at 200° C. Bond Strength | | | | Aged in Oil at 280° C. Broken at 200° C. Bond Strength | |
|---|---|---|---|---|---|---|
| | 50 hrs. | 400 hrs. | 800 hrs. | 1000 hrs. | 500 hrs. | 1000 hrs. |
| Example 1 | 29.8 lbs. | 28 lbs. | 23 lbs. | 18.6 lbs. | 24 lbs. | 24 lbs. |
| Comparative Example 2 | 11 lbs. | 10 lbs. | 8 lbs. | 7.5 lbs. | 10.5 lbs. | 7.5 lbs. |

As can be seen, the varnish of this invention, Example 1, exhibits vastly improved adhesive properties both in air and in oil at elevated temperatures. Storage stability without precipitate is also much improved. The varnish of this invention is also superior in terms of ease of coating wire and coil. Examples 2 and 3 will also give results similar to Example 1. While most high temperature varnishes give low or zero break strength values when heated in oil, the varnish of this invention will give 24 lbs. break strength at 280° C. for 500 hours when tested at 200° C. Since a large number of high performance motors use oil cooling, hot oil resistance properties of high temperature varnishes are very important. The varnish of this invention also gives good coatings without the need of a stringent cure cycle. Most applications can use simple cure schedules such as slow rise from 100° C. to 250° C. in approximately 2 hours, then a 2 hour to 4 hour hold at 250° C. or longer if very high bond strengths are required.

I claim:

1. A heat curable, storage stable, high temperature resistant, resinous, liquid insulating varnish comprising a heat reacted admixture comprising:
   (A) methoxy functional diphenyl oxide resinous material; and
   (B) metal halide catalyst, present in the range of from about 0.01 wt.% to about 0.2 wt.% based on the weight of (A), in combination with silicon dioxide stabilizer having a particle size of up to about 10 microns, present in the range of from about 2 wt.% to about 10 wt.% based on the weight of (A), where the silicon dioxide interacts with the metal halide to hinder the catalytic activity of the metal halide during room temperature storage after varnish formation.

2. The storage stable varnish of claim 1, where the silicon dioxide is effective to prevent precipitate formation in the varnish.

3. The storage stable varnish of claim 1, where the methoxy functional diphenyl oxide resinous material contains unsubstituted diphenyl oxide, at least about 50 wt.% of an oligomer component having weight average molecular weights of over about 350, the diphenyl oxide monomer content is below about 5 wt.%, and the silicon dioxide has a particle size of from about 0.1 micron to about 10 microns.

4. The storage stable varnish of claim 1, where the methoxy functional diphenyl oxide resinous material is the reaction product of:
   (A) diaryl compound selected from the group consisting of diphenyl oxide, diphenyl sulfide, their alkylated derivatives, or their mixtures;
   (B) formaldehyde; and
   (C) an aliphatic monohydroxy hydrocarbon compound having from 0 to 3 ether oxygens, not more than 4 carbon atoms between ether oxygens, and at least one free hydroxyl group.

5. The storage stable varnish of claim 1, where the catalyst is selected from the group consisting of $FeCl_3$, $AlCl_3$, $BF_3$, $SbCl_5$, $ZnCl_2$, $TiCl_4$, and mixtures thereof, and the weight average molecular weight of the methoxy functional diphenyl oxide resinous material is from about 500 to about 850.

6. The storage stable varnish of claim 1, where the metal halide catalyst is $FeCl_3$ dispersed in alcohol.

7. The storage stable varnish of claim 1, where reacted admixture is mixed with a solvent to provide a solids content of from about 25 wt.% to about 75 wt.%.

8. A heat curable, storage stable, high temperature resistant, resinous, liquid insulating varnish comprising a heat reacted admixture comprising:
   (A) methoxy functional diphenyl oxide resinous material having a weight average molecular weight of from about 500 to about 850 and containing below about 5 wt.% of unsubstituted diphenyl oxide monomer; and
   (B) metal halide catalyst, selected from the group consisting of $FeCl_3$, $AlCl_3$, $BF_3$, $SbCl_5$, $ZnCl_2$, $TiCl_4$, and mixtures thereof, present in the range of from about 0.01 wt.% to about 0.2 wt.% based on the weight of (A), in combination with silicon dioxide stabilizer, having a particle size range of from about 0.1 micron to about 10 microns, present in the range of from about 2 wt.% to about 10 wt.% based on the weight of (A), where the silicon dioxide interacts with the metal halide to hinder the catalytic activity of the metal halide during room temperature storage after varnish formation.

9. The storage stable varnish of claim 8, where the silicon dioxide is effective to prevent precipitate formation in the varnish, the methoxy functional diphenyl oxide resinous material contains at least about 50 wt.% of an oligomer component having weight average molecular weight of over about 350, the metal halide catalyst is $FeCl_3$, and the reacted admixture is mixed with a solvent.

10. The storage stable varnish of claim 1, where the admixture is heat reacted at from about 120° C. to about 175° C., to form the varnish, and where the diphenyl oxide resinous material is formed without using a chloromethyl diphenyl oxide starting material.

11. The storage stable varnish of claim 8, where the admixture is heat reacted at from about 120° C. to about 175° C., to form the varnish, and where the diphenyl oxide resinous material is formed without using a chloromethyl diphenyl oxide starting material.

* * * * *